No. 769,887. PATENTED SEPT. 13, 1904.
B. B. BOWERS.
CANDY FORMING MACHINE.
APPLICATION FILED SEPT. 30, 1903.
NO MODEL.
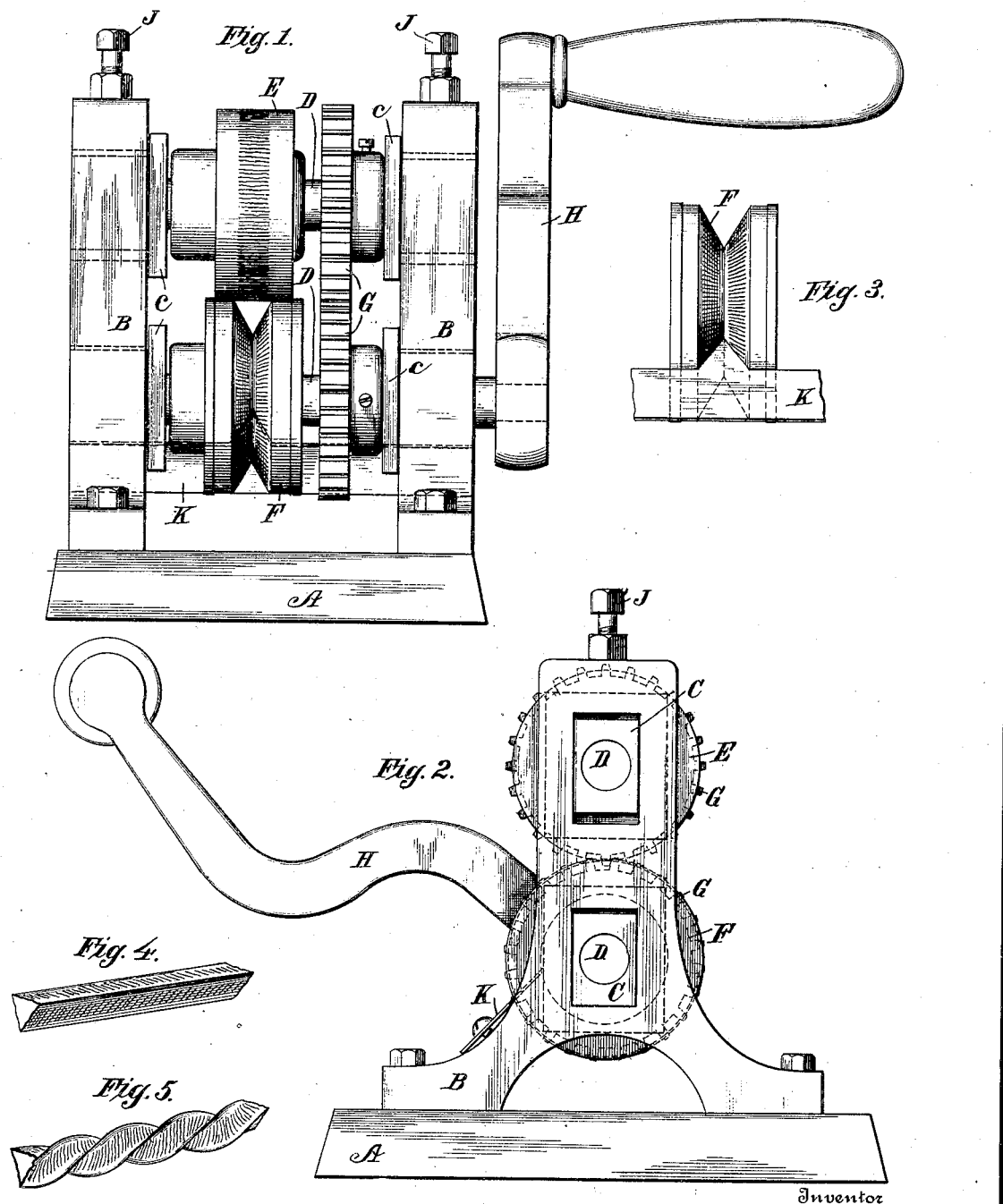

No. 769,887. Patented September 13, 1904.

UNITED STATES PATENT OFFICE.

BOSE B. BOWERS, OF MACON, GEORGIA.

CANDY-FORMING MACHINE.

SPECIFICATION forming part of Letters Patent No. 769,887, dated September 13, 1904.

Application filed September 30, 1903. Serial No. 175,183. (No model.)

*To all whom it may concern:*

Be it known that I, BOSE B. BOWERS, a citizen of the United States, residing at Macon, in the county of Bibb and State of Georgia, have invented certain new and useful Improvements in Candy-Forming Machines; and I do hereby declare the following to be a full, clear, and exact description of the invention, such as will enable others skilled in the art to which it appertains to make and use the same.

My invention relates to candy-making, and more particularly to machines for forming candy in its plastic condition into sticks of angular form.

The principal objects of the invention are, first, to provide a simple and efficient machine for this purpose, especially for making triangular or three-cornered candy, which hitherto has been manufactured with difficulty and expense by hand or with molds, and, second, to provide for forming such angular candy in the best condition for twisting afterward into the "lightning-rod" stick or bending into other forms desired.

The invention will first be described hereinafter with reference to the accompanying drawings, which are to be taken as a part of this specification, and it will then be defined more particularly in the annexed claims.

In said drawings, Figure 1 is a front elevation of a candy-forming machine embodying my invention. Fig. 2 is a side view thereof. Fig. 3 is a fragmentary view showing the back of the lower forming-roller and the scraper for removing adhering candy therefrom and for preventing the candy from winding on the roller. Fig. 4 shows a portion of a stick of candy formed by the machine. Fig. 5 shows the stick after having been twisted.

The principal feature of my improved machine consists of a pair of coacting forming-rollers, having their peripheral surfaces constructed so as to provide between them an angular opening, through which as the rollers are rotated the candy is passed or drawn in its plastic condition to impart thereto the desired configuration. For forming triangular or three-cornered candy one roller has a plain circular or even periphery, while the other roller has a peripheral V-shaped or angular groove, thus presenting a triangular opening between the rollers. The surfaces of the rollers which engage the candy are preferably roughened for securing a hold upon the plastic material. This roughening is desirably attained by transversely milling, grooving, or scratching the said engaging surfaces, as shown in Figs. 1 and 3, which produces minute transverse ribs or indentations on the sticks of candy. It is important, however, in forming angular candy, which afterward is to be twisted or bent, to leave the edges or corners of the sticks perfectly smooth, since if they were rough the sticks would crack in twisting. For this reason the roughened surfaces are confined on one roller to the middles of the sides of the groove and on the other roller to the part intermediate the outer edges of the groove— that is, the roughened surfaces are not in any instance as wide as the corresponding sides of the triangular opening, thus leaving the bottom edge or corner of the groove, as well as the two outer edges between the open side of said groove and the plain roller, smooth, so that the candy-sticks which pass between the rollers have their sides roughened, but their edges or corners smooth, and adapted to be bent or twisted without liability of cracking. In order to insure proper relation of the rollers and have the roughened part of the plain roller lie exactly between the outer edges of the groove, the rollers are preferably formed with coacting guides, as grooves and ribs, or one roller may be formed with slight circumferential ribs or with a shallow peripheral depression between or within which the other roller may lie and be guided, though I am not limited to any particular guiding means. In addition to these features the machine also includes several important adjuncts, as will hereinafter appear.

Referring to the machine illustrated in the drawings, the letter A denotes a supporting-base, and B B standards or uprights rising therefrom, in which are mounted in suitable bearings C C the shafts or axles D D of the forming-rollers E and F.

The letters G G indicate intermeshing pinions on the shaft, and H designates a crank on one shaft—here the lower one—for operating the rollers. These rollers are represented as above described, the upper roller having a plain or even circular periphery, and the lower roller having a peripheral V-shaped groove. It will be noticed that the sides of the groove are roughened between the edges and the surface of the upper roller is roughened between the outer edges of the grooves, leaving the edges or corners of the triangular opening between the rollers smooth for the purposes explained. The lower roller is also represented having slight annular ribs or projections at opposite sides of its groove, between which the periphery of the upper roller is fitted and guided to insure keeping the rollers in proper relation.

The bearings C are shown in the form of blocks fitted in vertical slots or openings therefor in the standards. The lower shaft, with its roller and pinion, is first mounted in place, then the upper shaft, with its roller and pinion, and the bearings of the latter are then secured down in place by adjusting-screws J, inserted in the upper ends of the standards, so as to prevent the upper roller from rising from contact with the lower roller. Any suitable means, however, may be adopted for holding the rollers together.

It will be observed that the bearing-blocks are represented formed with flanges or flat plates at their inner faces, between the standard and the hubs or collars of the rollers at one side and between the standard and the collars of the pinions at the other side. These plates or flanges serve as washers, and they may be adjusted by moving the bearings laterally before the screws J are tightened, which is much more convenient than the use of separate washers. In assembling the parts of the machine the bearings at one side (the right-hand side in the drawings) may be inserted in their openings with their flanges flush against the inner side of the standard and the pinions fastened on the shaft bearing laterally against said bearings. The lower bearing at the opposite (left) side may similarly be inserted in its opening with its flange flush against the inner side of the opposite standard and the lower roller secured on the shaft bearing against said bearing. Then the upper roller may be secured on the upper shaft in proper relation to the lower roller, and the upper (left-hand) bearing adjusted to bear against the collar thereof, after which the screws J may be tightened, thus holding the shafts, rollers, and gears in steady relation.

At the back of the machine a suitable device may be arranged for scraping out any of the plastic material which may lodge in the groove of the roller and for preventing the candy from winding itself on the grooved roller. This is shown in Figs. 2 and 3 as a V-shaped pointer fitting in the groove and projecting from a cross-bar or strip K, secured on the standards. It is also indicated in dotted lines in Fig. 1.

The operation, as before explained, consists in passing the candy in plastic condition between the rollers as the latter are rotated, thus imparting thereto the shape of the angular opening between the coacting surfaces of the rollers and producing a stick of the form illustrated in Fig. 4. The roughened surfaces of the rollers secure a good hold upon the material, while the smooth surfaces at the edges leave the corners or edges of the stick perfectly smooth, so that the stick may afterward be bent or twisted without liability of cracking. In Fig. 5 the stick is represented twisted into the "lightning-rod" form.

By providing both rollers with confronting V-shaped notches similar to that of the lower roller of the present machine diamond-shaped or four-cornered sticks may be produced, also having smooth edges susceptible of twisting, bending, or stretching in the subsequent formation of the stick, and by changing the form of the groove or grooves sticks of other configuration may be made.

The machine is of course susceptible of various modifications in details of construction and arrangement, and the invention may be embodied not only in a single hand-operated machine, as illustrated herein, but in machines in which a number of pairs of rollers are employed and driven by power.

Having thus fully described my invention, what I claim as new, and desire to secure by Letters Patent of the United States, is—

1. A candy-forming machine having, in combination, a pair of coacting forming-rollers, one having a substantially plain or even periphery and the other a V-shaped peripheral groove, for forming plastic candy passed between them into a triangular stick, the sides of said groove and the intermediate surface of the coacting roller being milled across by elongated indentations extending not quite to the three corners of the groove, so as to grip the stick at the sides and leave its edges smooth.

2. A candy-forming machine having, in combination, a pair of coacting forming-rollers with their peripheral surfaces constructed to provide a constant angular opening between them, for forming plastic candy passed through said rollers into an angular stick, the candy-engaging surfaces of said rollers being milled across except at the corners of said opening, and one roller having circumferential projections at opposite sides of said opening between which the other roller is fitted and guided.

3. In a candy-forming machine, a pair of coacting forming-rollers, bearings therefor laterally adjustable to serve also the function of washers, the bearings of one roller being also transversely adjustable, and adjusting-screws bearing against the latter bearings to hold the rollers together.

4. In a candy-forming machine, the combination of supporting-standards, coacting forming-rollers provided with intermeshing gears between said standards, bearings for the shafts or spindles of said rollers and gears fitted in vertical slots or openings in said standards and laterally adjustable and having inner flanges or plates which serve as washers, adjusting-screws inserted in the ends of said standards against one pair of bearings, and means for rotating the rollers.

5. In a candy-forming machine, coacting forming-rollers having an angular opening between them through which the candy in plastic condition is passed, the candy-engaging surfaces of said rollers being transversely milled by elongated indentations extending across said surface except at the edges, so as to leave the corners or edges of the stick smooth.

In testimony whereof I affix my signature in presence of two witnesses.

BOSE B. BOWERS.

Witnesses:
L. D. MOORE,
OLIVER ORR.